United States Patent [19]

Benton et al.

[11] Patent Number: 4,905,533
[45] Date of Patent: Mar. 6, 1990

[54] SEAL AND SCRAPER ASSEMBLY FOR BALL BEARING SCREWS AND THE LIKE

[75] Inventors: Robert L. Benton, Bay City; Dainis O. Martinsons, Saginaw, both of Mich.

[73] Assignee: Thomson Saginaw Ball Screw Company, Inc., Saginaw, Mich.

[21] Appl. No.: 289,829

[22] Filed: Dec. 27, 1988

[51] Int. Cl.$^4$ .............................................. F16H 55/02
[52] U.S. Cl. ................................ 74/459; 74/424.8 R; 277/24; 277/165
[58] Field of Search ............... 74/424.8 R, 89.15, 459; 277/136, 137, 207 R, 208, 203, 167, 177, 173, 58, 205, 124, 125, 199

[56] References Cited

U.S. PATENT DOCUMENTS

| | | | |
|---|---|---|---|
| 3,646,827 | 3/1972 | Patterson | 277/165 X |
| 3,669,460 | 6/1972 | Wysong | 74/459 X |
| 4,053,167 | 10/1977 | Jelinek | 277/165 |
| 4,085,942 | 4/1978 | Yoshida et al. | 277/136 X |
| 4,226,431 | 10/1980 | Jelinek et al. | 277/165 |
| 4,407,511 | 10/1983 | Benton et al. | 277/136 X |

Primary Examiner—James R. Brittain
Attorney, Agent, or Firm—Learman & McCulloch

[57] ABSTRACT

A seal and scraper assembly for a ball screw and nut actuator has a resilient seal ring for reception by the nut which includes a radially internal helical thread mating with the screw groove. The seal ring further has a radially compressible annular lip extending at an angle in an axially outboard direction from the outer periphery of the ring to engage and be radially compressed by the nut. A rigid, annular mount ring also has an internal thread received by the screw groove which has an axially inboard portion interfitting with the seal ring so as to permit relative axial movement of the seal ring and mount ring, while preventing relative rotation of the rings.

14 Claims, 3 Drawing Sheets

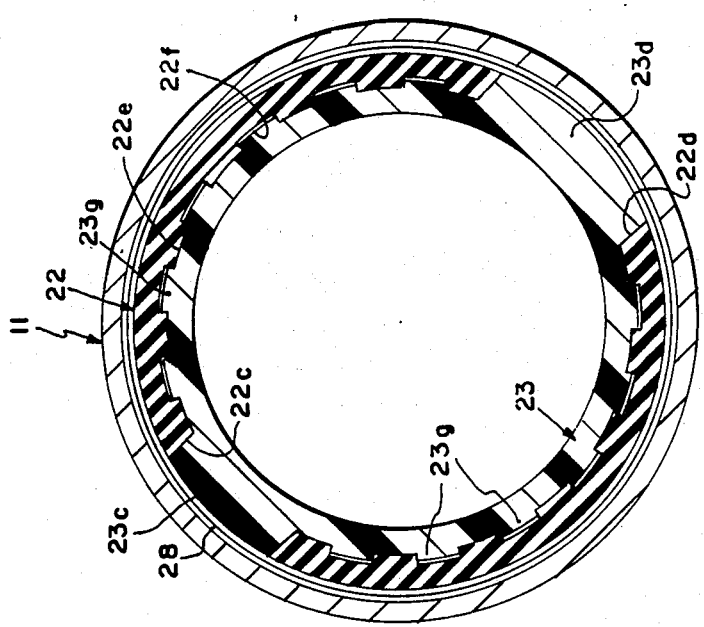
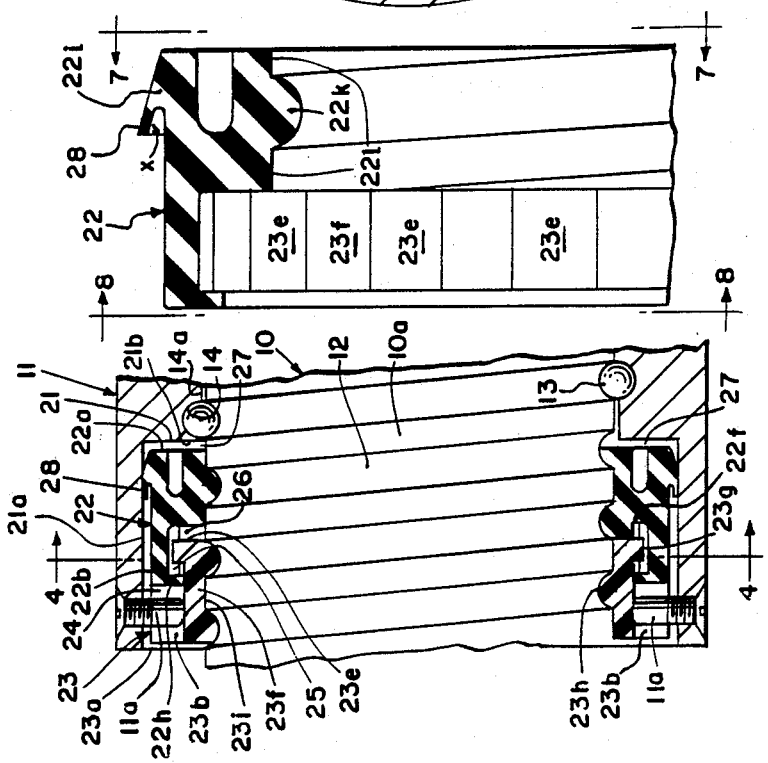
FIG.4
FIG.3
FIG.2

SEAL AND SCRAPER ASSEMBLY FOR BALL BEARING SCREWS AND THE LIKE

BACKGROUND OF THE INVENTION

This invention relates to seal and scraper assemblies for ball screw and nut actuators and the like. A number of such assemblies of varying construction, have been proposed, as exemplified in the following United States patents:

| | | | |
|---|---|---|---|
| 3,116,931 | Edwards | 4,053,167 | Jelinek |
| 3,132,719 | Cole | 4,085,942 | Yoshida et al |
| 3,646,827 | Patterson | 4,226,431 | Jelinek et al |
| 3,669,460 | Wysong | 4,407,511 | Benton et al |
| 4,052,076 | Wysong | | |

The present invention relates to certain improvements in seal and scraper assemblies of the general type disclosed in the present assignees' U.S. Pat. No. 4,407,511, which considerably expand the field in which ball screw assemblies utilizing the invention may efficiently be utilized. As will become apparent, the assembly which has been devised is useful in applications where high-pressure wash water is axially directed against the seal, and the ingression of water must be prevented. The assembly is further useful in conditions where the entrance of frost or ice, which may tend to hydroplane past the seal, needs to be prevented.

SUMMARY OF THE INVENTION

The present two-part assembly comprises a rigid mount, or scraper ring, which is non-rotatably retained at each end of the ball nut, and which has wiper-shielding internal threads configured to be received by and mate with the screw. The scraper ring mounts a resilient wiper seal ring which also has internal helical threads configured to be received by, and to mate with, the screw inboard of the scraper ring.

While the scraper ring and resilient seal ring have interfitting parts preventing their relative rotation, the parts are permitted to float axially with respect to one another. The resilient seal ring, which is of the general type disclosed in the present assignees' prior patent No. 4,407,511, has a radially inner wiping portion defined by its internal threads, and a radially outer seal portion which engages the inner peripheral surface of the nut. In the present assembly, the sealing section comprises an outwardly inclined, radially projecting annular lip which extends in an axial direction opposite to the direction of extension of the seal lip utilized in U.S. Pat. No. 4,407,511. The present lip can axially float to achieve its most efficient compressed configuration while the two-part assembly relatively adjusts for manufacturing tolerances.

One of the prime objects of the present invention is to provide a two-part device effective to wipe grease from the screw and retain it within the nut more effectively with less imposition of torque resistance, while at the same time providing a device which seals the inboard operating parts from ice, foreign particles, and high pressure water in a manner which greatly expands the areas in which ball screw assemblies incorporating the invention can be utilized.

Another object of the invention is to provide a two-part construction of the character described, wherein one part is a relatively rigid scraper or mount ring, and the other part is a resilient seal ring coupled to the scraper ring in a manner to permit axial float between the parts, while preventing their relative rotation.

Still another object of the invention is to provide a thread seal construction, having a bladder type lip which expands against the internal diameter of the nut, as outside water pressure, for example, increases, to utilize the pressure of the water seeking ingression to halt its ingression at the wiper-seal nut interface. The construction further operates to relieve internal grease pressure and the need for any type of vent hole.

A still further object of the invention is to provide a construction which operates at comparatively low torque with great efficiency, little or no maintenance, and with a predictable service life.

Other objects and advantages of the invention will be pointed out specifically or will become apparent from the following description when it is considered in conjunction with the appended claims and the accompanying drawings.

IN THE DRAWINGS

FIG. 2 is a greatly enlarged, fragmentary, sectional elevational view, showing the assembly of the present invention in sealing position within one end of a nut;

FIG. 3 is a still more enlarged, fragmentary, sectional elevational view of the resilient portion of the seal ring only;

FIG. 4 is a transverse sectional view, taken on the line 4—4 of FIG. 2;

DETAILED DESCRIPTION

Figure 1:
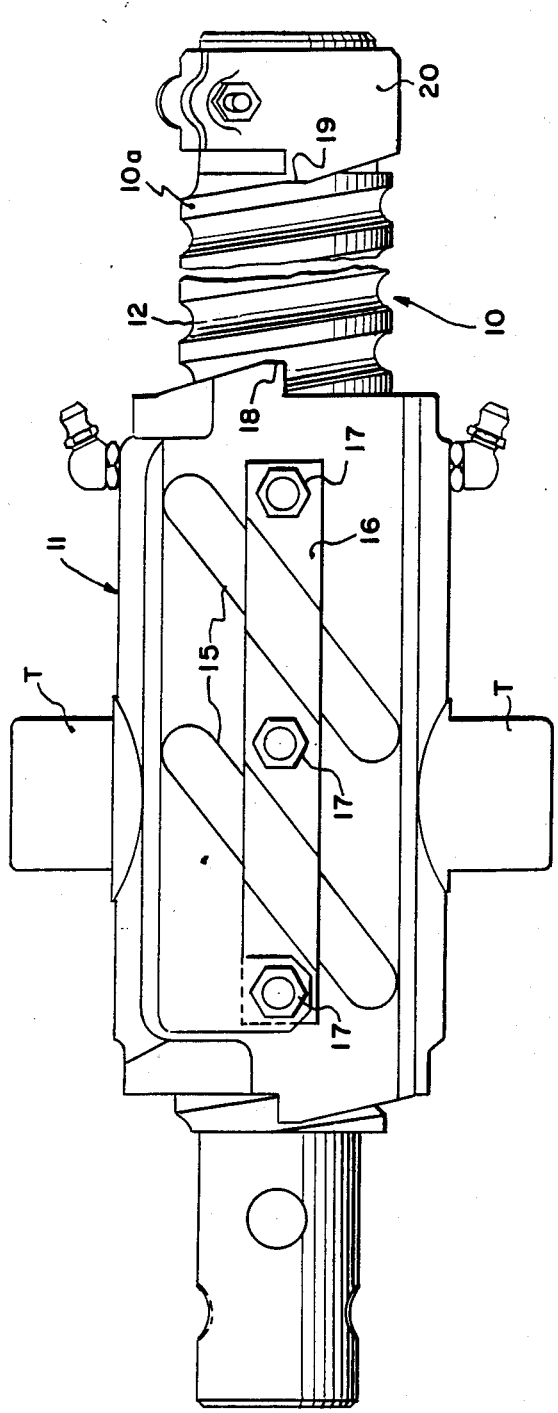
FIG. 1 is an elevational view of a typical ball nut and screw assembly which incorporates the invention.

Referring now more particularly to the drawings, and in the first instance to FIG. 1, a typical ball nut and screw assembly comprises a screw, generally designated 10, assembled with a ball nut, generally designated 11. The screw 10 has a continuous helical thread 10a, and a continuous helical groove 12 of semi-circular cross section providing a raceway for balls 13, which permit relative rotation and translation of the nut 11 and screw 10 with relatively low frictional impedance. As FIG. 2 indicates, the ball nut 11 has a mating internal helical groove 14, bounded by a helical projection 14a in the usual manner, and ball returns 15 which span a number of turns of the helical groove 12, to provide for ball recirculation. A clamp plate 16, secured by fasteners 17, may be provided to secure the ball return casings 15 in position. Trunnions T can be provided on the nut 11 to facilitate mounting the ball screw and nut assembly in position.

Provided at each end of ball nut 11, in the conventional manner, are stop surface shoulders 18, to cooperate with stop surfaces 19 provided on stops 20 which secure to the screw 10. The stops define the relative axial movement of the screw 10 and nut 11 which is permitted.

As FIG. 2 particularly indicates, the nut 11, at each end, may be counterbored as at 21, to provide an inset internal peripheral surface 21a, and a radial wall 21b.

The counterbores 21 provide scraper and seal receiving surfaces at each end of the nut 11, which are of the character particularly disclosed in FIGS. 2-8.

Each seal and scraper assembly comprises a resilient seal ring, generally designated 22, and a mating outboard scraper ring, generally designated 23. While nut 11 and screw 10 are normally formed of a rigid metallic material, both the members 22 and 23 may be formed from non-metallic materials. Member 23 is typically a rigid ring formed from a material such as a phenolic plastic, whereas ring 22 may be formed from an elastomeric nitrile, or other suitable resilient and rubber-like material. The ring 23 may also be formed of metal. Typically the seal 22 will have a durometer rating in the range 40-90.

Figures 5, 6:
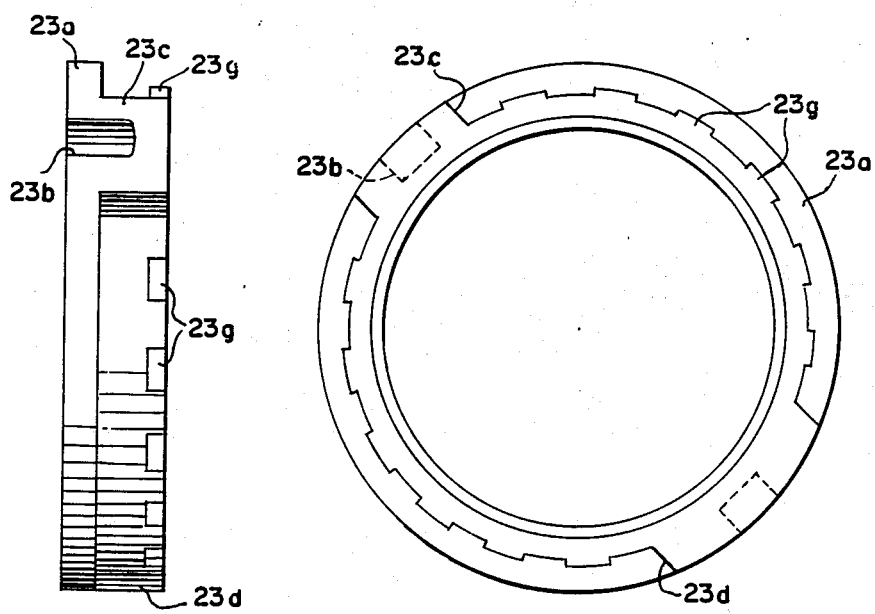
FIG. 5 is an edge elevational view of the scraper ring only.
FIG. 6 is an inner end elevational view thereof.

As FIGS. 2, 5 and 6 particularly indicate, the outboard part of the composite assembly, the scraper ring 23, comprises an axially outer annular flange 23a, provided with axial slots 23b to receive set screws or tangs 11a which project radially inwardly from the nut 11 and prevent relative rotation between the ring 23 and nut 11. Alternatively the slots may be provided in the nut and the tangs on the ring 23. Axial and radial float of the ring 23 with respect to the nut 11 is, however, permitted by the construction.

The slots 23b are provided in axially projecting keys 23c and 23d of differing arcuate extent, which are disposed in 180° opposing, relation. Between these keys, diametrically reduced, axially inboard seal-mounting end 23e and intermediate web portion 23f are provided. A series of radially projecting teeth or splines 23g of rectangular configuration, are provided on the end 23e, between the projecting key portions 23c and 23d, as shown in FIGS. 5 and 6.

The radially internal surface of ring 23 is helically threaded to closely mate with the thread 10a and groove 12 of screw 10, and the thread is of such axial extent that up to two helical turns of the screw groove 12 are spanned by the radially inwardly projecting ring thread 23h. Thread 23h is accommodated in the screw groove 12 and defines helical groove portion 23i which receives the thread 10a of screw 10, as indicated in FIG. 2.

As FIG. 2 further illustrates, resilient seal ring 22 comprises an axially inboard end sealing portion, generally designated 22a, and an axially outboard mounting portion, generally designated 22b, which has keyways or slots 22c and 22d, respectively, for receiving the keys 23c and 23d. Provided between the keyways or slots 22c and 22d, are splines and grooves 22e and 22f, respectively, which interfit with the teeth 23g provided on the ring 23. Teeth 23g are of considerably shorter axial extent than the grooves 22f which receive them.

Retention lips 22h are provided on ring 22 between the key openings 22c and 22d, and maintain the ring 23 and seal ring 22 in axially assembled position, while permitting them some axial float. In a typical assembled position of the assembly, there will be an axial space 24 between the flange 23a and lip 22h, and an axial space 25 between the lip portion 22h and the end portion 23e and its teeth 23g. There will likewise be an axial space 26 between the end portion 23e of load ring 23 and the portion 22a of the seal ring 22. Similarly, an axial space 27 will be present between the inner end wall of the seal ring 22, and the radial counterbore face 21b.

The inboard end 22a of seal ring 22, includes a radially outer wall portion 22i (see particularly FIGS. 2 and 3), having an integral lip 28 which, in non-compressed condition, extends at an acute angle in an outboard direction, as shown in FIG. 3. When the seal is in inserted position, the lip 28 is collapsed radially and functions as a sealing surface, in the manner illustrated in FIG. 2.

Radially inward of wall 22i, and spaced circumferentially as at 29 from the wall 22i, are wiper thread portions 22j, which wipe the grease or lubricant from the screw and tend to return it in an inboard direction. Internally the ring 22, inboard of spline projections 22e, is threaded to match the screw 10, and thus has, in addition to the thread projection 22j, the thread grooves 22l, all of which collectively function as both seals and scrapers. The interrupted scraper threads have ends 22k which project radially inward of the remaining portions of the threads and are compressed when the ends are in engagement with the screw groove 22l. The internally threaded portion of the ring 22 spans at least one turn of the screw thread projection 10a, and extends into the adjacent root groove 12 on each side thereof.

Figures 7, 8:
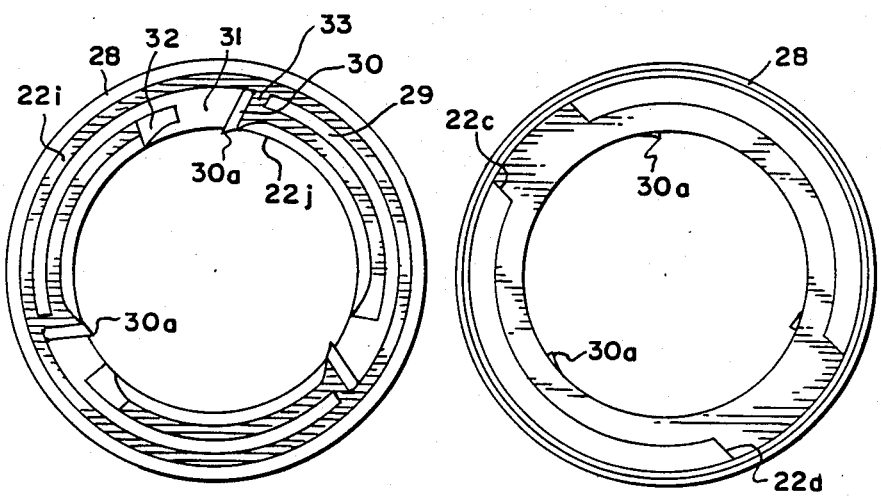
FIG. 7 is an inner end elevational view of the resilient seal ring only.
FIG. 8 is an opposite, outer end elevational view thereof.

As particularly shown in FIG. 7, and as in U.S. Pat. No. 4,407,511, the thread form seal portion 22j is interrupted by several generally radial scraper or wiper surfaces 30 intersecting the radial direction of the screw 10 at an oblique angle. Circumferentially spaced from each scraper surface 30, and spaced a distance circumferentially therefrom as at 31, is an axially inclined lubricant return surface 32 opposite the surface 30, for the purpose of directing the lubricant axially inward relative to the outer end of the nut. The scraper surface 30 has a leading edge 30a, which in its uncompressed state, extends radially inwardly of the thread form seal projection 22j, and accordingly is radially compressed when installed in position, as indicated in FIG. 2. Each scraper surface 30 is connected to outer wall portion 22i of the ring by a web 33, as previously, with the front surface of the web also functioning as a portion of the scraper surface 30. Inner thread form seal portion 22j is of sufficient extent to seal along the thread form of screw 10, so that the interruptions created by scraper surface 30, and return surface 32, do not provide axially open flow passages through which lubricant can escape.

THE OPERATION

In operation, the composite assembly formed by annular rings 22 and 23, is allowed to move axially in the counterbore 21 to allow for axial lash between the nut 11 and screw 10. At the same time, the seal ring 22 is permitted to float, or move, axially with respect to the ring 23, to relatively adjust to manufacturing tolerances and permit lip 28 to compress to maintain continuous circumferential contact.

Relative rotation and translation of the screw 10 and nut 11, causes the internal thread projections 22j of the seal ring 22 to scrape or wipe lubricant from the groove 12, and redirect it in an axially inward direction. The internally threaded surface of ring 23 shields the projections 22j from outside influence, and further, of course, could function as a grease scraper and retainer on an emergency basis in the event of damage to the seal 22 internal threads.

With the lip 28 extending in a direction toward the ring 23, when wash water under high pressure seeking to enter the nut enters the space radially inward of compressed lip 28 and exerts a pressure in the radial direction x, it causes the annular bladder wiper lip 28 to only more tightly seal. Lip 28 alleviates manufacturing imperfections in the sense that it allows the wiper threads 22j to conform to the screw threads 10a without undue frictional impedance, while, at the same time, relieving undue internal grease pressure such that vent holes for eliminating these pressures need not be provided.

The square tooth spline structure provided to intermesh the wiper ring 22 and ring 23 at 23g and 22e, aids in combatting any radial movement between the wiper ring 22 and the ring 23.

With the construction indicated, outside dynamic water pressures may be tolerated without entrance of water to the interior of the nut 11. The internal threads of the load ring 23, prevent the ingression of foreign material such as sand, dust, frost and ice into the nut, and remove it from screw 10. In a sense, the ring 23 operates as an ice-breaker, and shields the wiper ring 22 from ice particles and the like, which may be seeking to enter the assembly along the external thread surface of screw 10.

Finally with the two-piece construction which has been described, a change of either ring 22 or 23 in the assembly is easily accomplished, and the assembly is easily made and oriented to assure an exact fit within the ball nut.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. A ball screw and nut assembly comprising:
 a. an axially extending screw having an external helical thread and a ball receiving helical groove for the reception of a series of balls;
 b. a nut, having an internal helical groove, bounded by seal and scraper assembly receiving end surface portions, received on said screw;
 c. said helical grooves of the screw and nut forming a raceway;
 d. balls received in said raceway permitting relative rotation and translation of said nut and screw with relatively low frictional impedance;
 e. a non-rigid, resilient, annular seal ring housed by said nut in said receiving portion at each end of the nut and having an axially inboard section and an axially outboard section;
 f. said inboard section including a radially internal helical thread projection received by and mating with said screw groove;
 g. said inboard section further having a radially compressible lip integrated with its outer periphery and extending at an acute angle from said outer periphery in an axially outboard direction to engage and be radially compressed by said nut;
 h. a comparatively rigid, annular mount ring at each end of the nut, at least partly outboard of the seal ring, and having an axially inboard portion interfitting with said seal ring, the mount ring and seal ring having interfitting parts permitting relative axial movement of the seal ring and mount ring;
 i. the mount ring also having a radially internal thread received by and mating with said screw groove; and
 j. the mount ring and nut having parts preventing the mount ring in said receiving surface portions of the nut at each end of the nut from rotating relatively.

2. The assembly of claim 1 wherein said interfitting parts on the mount ring and seal ring comprise circumferentially arranged spline and groove connections.

3. The assembly of claim 1 wherein said inboard section of the seal ring has a radially inner scraper portion defined by said helical thread, and a radially outer seal portion defined by said lip; said scraper and seal portions being radially spaced and connected by compressible connecting web sections.

4. The assembly of claim 1 wherein said seal ring helical thread is circumferentially interrupted by recess portions providing a generally radial scraper surface on one radial marginal side and an axially inclined grease return deflecting surface on the other; and said helical thread on the inboard section of the seal ring has at least one complete turn disposed to block grease from passing axially through said interruptions in a direction toward said mount ring.

5. The assembly of claim 4 wherein said inboard section of the seal ring has a radially outer annular wall radially spaced from said interrupted internal helical thread.

6. The assembly of claim 1 wherein each mount ring thread has up to two helical turns.

7. In a seal and scraper assembly for a ball screw and nut actuator having an axially extending screw with an external helical thread and a ball receiving groove, and a nut, having an internal helical groove bounded at least at one end by a seal and scraper assembly receiving end surface portion, received on said screw, with said grooves of the screw and nut forming a raceway for balls permitting relative rotation and translation of said nut and screw with relatively low frictional impedance:
 a. a non-rigid, resilient, annular seal ring for reception by said nut in said receiving portion at at least one end of the nut and having an axially inboard section and an axially outboard section;
 b. said inboard section including a radially internal helical threaded projection received by and mating with said screw groove;
 c. said inboard section further having a radially compressible lip integrated with its outer periphery and extending at an acute angle from said outer periphery in an axially outboard direction to engage and be radially compressed by said nut;
 d. a comparatively rigid, annular mount ring at each end of the nut having an axially inboard portion integrated with said seal ring to prevent relative rotation between the rings;
 e. the mount ring also having a radially internal thread received by and mating with said screw groove; and
 f. the mount ring having parts cooperable with said nut for preventing relative rotation of the nut and mount ring.

8. In a seal and scraper assembly for a ball screw and nut assembly having an axially extending screw with an external helical thread and a ball receiving groove, and a nut, having an internal helical groove, bounded by at least one seal and scraper assembly receiving end surface portion, received on said screw, with said grooves of the screw and nut forming a raceway for balls permitting relative rotation and translation of said nut and screw with relatively low frictional impedance:
 a. a non-rigid, resilient, annular seal ring for reception by said nut in said receiving portion at at least one end of the nut and having an axially inboard section and an axially outboard section;

b. said inboard section including a radially internal helical thread projection received by and mating with said screw groove;

c. a comparatively rigid, annular mount ring at at least one end of the nut having a radially internal thread projection received by and mating with said screw groove, the mounting ring also having an axially inboard portion interfitting with said seal ring, the mount ring and seal ring having interfitting means preventing relative rotation of the rings while permitting some relative axial floating movement of the seal ring and mount ring to achieve independent seating of the thread projection of each in the screw groove; and d. the mount ring having parts cooperable with the nut for preventing relative rotation of the nut and mount ring.

9. The assembly of claim 8 wherein said interfitting parts on the mount ring and seal ring comprise circumferentially arranged axially parallel spline and groove connections consisting of splines on one of the mount ring and seal ring and grooves on the other, and wherein the splines are of different axial length than the grooves.

10. The assembly of claim 8 wherein said inboard section of the seal ring further has an annular lip integral with the periphery of said seal ring and extending at an acute angle toward said mount ring to engage and be radially compressed by said nut.

11. The assembly of claim 10 wherein said inboard section of the seal ring has a radially inner scraper portion defined by said helical thread and a radially outer seal portion defined by said lip; said scraper and seal portions being radially spaced by compressible connecting web sections.

12. The assembly of claim 8 in which said interfitting means comprises parts of differing axial length.

13. The assembly of claim 8 wherein shoulder means on said mount ring and seal ring form a trap restricting total separation of said mount ring and seal ring.

14. A method of sealing the threads of a ball screw and nut assembly having an axially extending screw with an external helical groove, and a nut with an internal helical groove bounded by a thread seal receiving end surface portion which is received on the screw, with the helical grooves of the screw and nut forming a raceway for balls permitting relative rotation and translation of the nut and screw, with relatively low frictional impedance, and wherein a resilient seal ring has an inboard section with a radially internal helical thread adapted to be received by the screw groove, and is provided with a rigid mount ring with a radially internal thread adapted also to be received by the screw groove, the mount ring and seal ring having interfitting parts capable of preventing their relative rotation while permitting relative axial movement of the rings, the steps of:

a. axially relatively moving the seal ring and mount ring to interfit the interfitting parts thereof to form an assembly;

b. relatively moving an interfitted seal ring and mount ring, and a nut, axially to position the seal ring and mount ring in said receiving end surface portion of the nut and restrain relative rotation of the nut and assembly;

c. relatively rotating the nut and screw to thread the screw into the nut, and the seal ring and mount ring; and d. relatively axially moving the seal ring and mount ring to permit each to adjust independently to the helical configuration of the screw groove.

* * * * *